(12) United States Patent
Glowacki (10) Patent No.: US 8,819,277 B2
(45) Date of Patent: Aug. 26, 2014

(54) SYSTEM AND METHOD FOR DELIVERING ALERTS

(75) Inventor: Konrad Skarbimir Glowacki, Ustka (PL)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 13/551,042

(22) Filed: Jul. 17, 2012

(65) Prior Publication Data

US 2014/0025749 A1   Jan. 23, 2014

(51) Int. Cl.
  *G06F 15/173* (2006.01)
(52) U.S. Cl.
  USPC ............ 709/238; 709/203; 709/217; 709/240
(58) Field of Classification Search
  CPC ............ H04L 12/1895; H04L 12/1859; H04L 12/587; H04L 51/24; G06F 9/542
  USPC .................................. 709/203, 217, 238, 240
  See application file for complete search history.

(56) References Cited

U.S. PATENT DOCUMENTS

| | | | |
|---|---|---|---|
| 5,493,692 A | 2/1996 | Theimer et al. | |
| 6,601,012 B1 * | 7/2003 | Horvitz et al. | 709/223 |
| 7,877,082 B2 * | 1/2011 | Eagle et al. | 455/414.1 |
| 8,291,011 B2 * | 10/2012 | Abu-Hakima et al. | 709/203 |
| 2002/0160757 A1 * | 10/2002 | Shavit et al. | 455/414 |
| 2003/0212646 A1 * | 11/2003 | Horvitz | 706/46 |
| 2007/0214228 A1 * | 9/2007 | Horvitz et al. | 709/207 |
| 2010/0189096 A1 * | 7/2010 | Flynn et al. | 370/352 |
| 2010/0241723 A1 * | 9/2010 | Dornbush | 709/207 |

* cited by examiner

*Primary Examiner* — Phuoc Nguyen (74) *Attorney, Agent, or Firm* — Leydig, Voit & Mayer, Ltd.

(57) ABSTRACT

A technique is provided for delivering an alert to a user. The technique includes identifying which single device of a user's multiple devices should receive the alert. A server is configured to collect device statistics about the user's devices and determine which device should receive the alert. Example device statistics include locations of the devices, last use time of the devices, statistics received from other applications that the user is accessing (e.g., email, search engine, applications, mobile apps, etc.), statistics from other users in the same location as the user, statistics from cameras, motion detectors, or proximity sensors associated with the devices, history/pattern of the user consuming previous alerts, what type of message is associated with the alert (e.g., email, SMS, picture, video, etc.), and/or whether a particular device is ON/OFF or locked/unavailable, among others.

15 Claims, 7 Drawing Sheets

SYSTEM AND METHOD FOR DELIVERING ALERTS

BACKGROUND

In many data communication systems, an alert is presented to a user to inform the user that a message has been received and is available to be consumed by the user. For example, a user may be interacting with a personal computer that is executing an email client. When a new email message is received, a dialog box appears on user's monitor and a sound is played through the speakers alerting the user of the new email message. The user can then select the alert (e.g., by clicking) to open the new email message.

Users often have access to several different devices that could consume the message. For example, a user could have one or more of a mobile phone with advanced computing capabilities (e.g., a "smartphone"), a tablet computer, a laptop computer, a desktop computer, an Internet-enabled television (TV), an Internet-enabled appliance (e.g., wireless fridge), or any other type of device. In many cases, multiple devices are capable of consuming the message.

When a message is received from a data communication system, it is not uncommon for the user to receive a separate alert on each of multiple devices. For example, a user may be at home when a new email message is received. The user's mobile phone may play a sound and display a message, the user's tablet may play a sound, the user's TV may display a message, the user's laptop may display a dialog box and play a sound, and/or the user's Internet-enabled appliance may display a message, play a sound, and/or flash a light. Presenting multiple alerts that are related to the same message can be redundant. In addition, receiving multiple alerts can be quite annoying to the user, especially when the alert is received after the message has already been consumed, which may cause confusion.

Accordingly, there remains a need in the art for a technique for delivering alerts that addresses the drawbacks and limitations discussed above.

SUMMARY

One embodiment provides a method and computer-readable medium for delivering an alert to a user. The method includes determining that an alert should be delivered to the user, wherein the alert is associated with a message that includes message data; receiving device data corresponding to two or more devices associated with the user, wherein at least one of the two or more devices is capable of receiving the message; receiving alert information corresponding to the alert; calculating a score for each of the two or more devices associated with the user based on the device data corresponding to the two or more devices and the alert information corresponding to the alert; sending an alert to the device having the highest calculated score; and sending the message data to the device having the highest calculated score.

Another embodiment provides a method for delivering an alert to a user. The method includes determining that an alert should be delivered to the user, wherein the alert is associated with a message that includes message data; receiving device data corresponding to one or more devices associated with the user, wherein at least one of the one or more devices is capable of receiving the message; identifying a single device of the one or more devices to which to send the alert based on the device data corresponding to the one or more devices; and sending a first alert to the single device.

Another embodiment provides a computer-readable storage medium storing instructions that, when executed by a processor, cause a first client device to receive an alert, by performing the steps of: receiving a request from a server for device data corresponding to the first client device, wherein the first client device is capable of receiving messages from the server; transmitting, in response to the request from the server, the device data corresponding to the first client device, wherein the server is configured to receive device data corresponding to at least one other client device; and receiving, at the first client device, an alert from the server, wherein the alert is associated with a message that is associated with message data, and wherein the server determined to send the alert to the first client device based on the device data corresponding to the first client device and the device data corresponding to at least one other client device.

Yet another embodiment provides a system that includes one or more client devices associated with a user and a server communicatively coupled to the one or more client devices. The server is configured to: determine that an alert should be delivered to the user, wherein the alert is associated with a message that includes message data; receive device data corresponding to the one or more client devices associated with the user, wherein at least one of the one or more client devices is capable of receiving the message; and identify a single client device of the one or more client devices to which to send the alert based on the device data corresponding to the one or more client devices.

DETAILED DESCRIPTION

A user may have access to a plurality of devices that are capable of consuming information. For example, a user may have one or more of a mobile phone with advanced computing capabilities (e.g., a "smartphone"), a tablet computer, a laptop computer, a desktop computer, an Internet-enabled television (TV), an Internet-enabled appliance (e.g., WiFi fridge), or any other type of device. Information of various types can be delivered to the devices, including email, SMS (short message service), picture message, video message, social networking update, application-related update, or any other type of information.

In some cases, when delivering a message, an alert can be delivered to a device separate from the data associated with the message. For example, when a new email is received, an alert, such as a dialog window stating "New Mail Received," may be displayed on a user's mobile phone. The alert is separate from the data of the message. In the email example, the "data" is the content of the email. The alert may include options to consume the message (e.g., view the new email) or to dismiss the message and consume later.

As described in greater detail herein, embodiments provide a technique for delivering an alert to a user. The technique includes identifying which single device of a user's multiple devices should receive the alert. A server is configured to collect device statistics about the user's devices and determine which device should receive the alert. Example device statistics include locations of the devices, last use time of the devices, statistics received from other applications that the user is accessing (e.g., email, search engine, applications, mobile apps, etc.), statistics from other users in the same location as the user, statistics from cameras, motion detectors, or proximity sensors associated with the devices, or any other information. In addition, the server can take other information into account when determining which device should receive the alert, such as a history/pattern of the user consuming previous alerts, what type of message is associated with the alert (e.g., email, SMS, picture, video, etc.), and/or whether a particular device is ON/OFF or locked/unavailable, among others.

Figure 1:
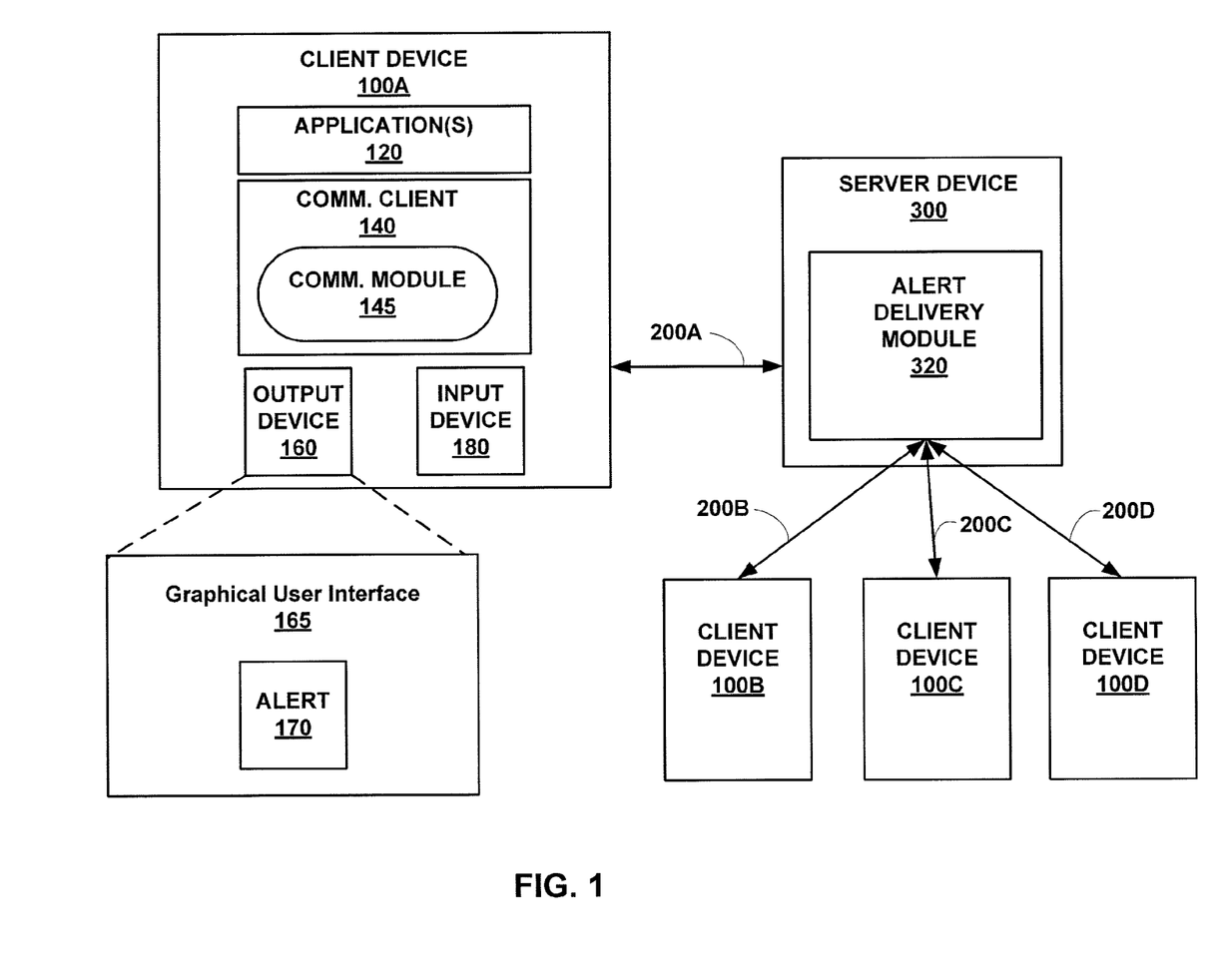
FIG. 1 is a block diagram of an example system for delivering alerts, including a plurality of client devices, according to one embodiment.
Figure 2:
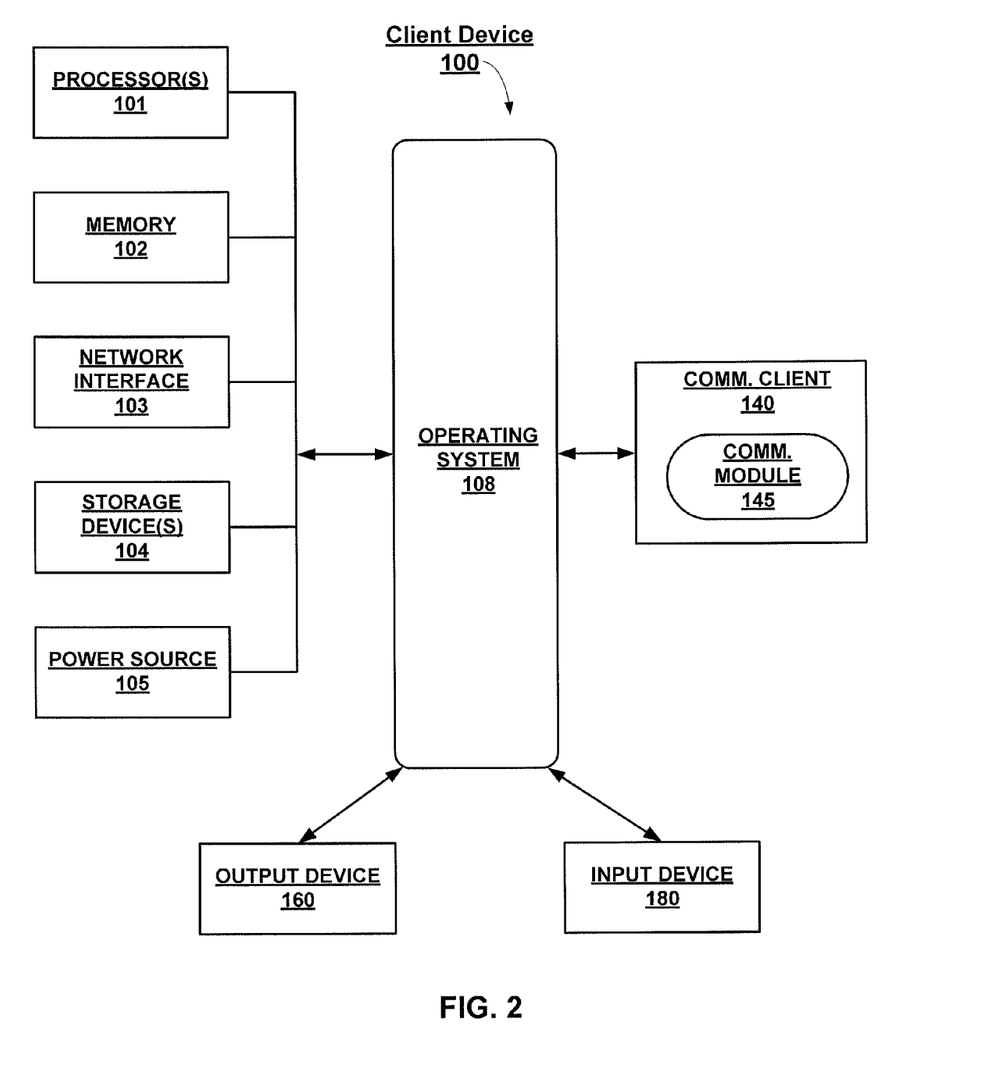
FIG. 2 is a block diagram of example functional components for one of the client devices in FIG. 1, according to one embodiment.

An example data delivery environment is described in FIGS. 1-2. The illustrated environment is presented as an example, and does not imply any limitation regarding the use of other data delivery environments. To the contrary, the description contemplates all implementations of data delivery environments that have the capability to present alerts.

FIG. 1 is a block diagram of an example system for delivering alerts, including a plurality of client devices, according to one embodiment. As shown, the system includes a server device 300 in communication with one or more client devices 100A-100D. Examples of client devices 100A-100D include, but are not limited to, portable, mobile, and/or stationary devices such as landline telephones, mobile telephones (including "smartphones"), laptop computers, tablet computers, desktop computers, personal digital assistants (PDAs), portable gaming devices, portable media players, e-book readers, Internet-enabled televisions, or Internet-enabled appliances, among others. In some embodiments, two or more client devices 100A-100D are the same type of device. For example, client devices 100A and 100B may both be mobile telephones. In other embodiments, two or more client devices are different types of devices. For example, client devices 100A and 100B may both be mobile telephones and client device 100C may be a tablet computer.

In the embodiment illustrated by FIG. 1, the client devices 100A-100D communicate with a server device 300 via a communications channels 200A-200D, respectively. In one embodiment, the communications channel 200 includes an Internet connection between the client device 100 and the server device 300. In other embodiments, the connection may be over cellular phone network or other type of network.

The server device 300 often comprises multiple physical servers for maintaining or hosting information delivered to the client devices 100A-100D. Each server can be a physically separate machine or can be different processes running within the same physical machine. The server device 300 includes an alert delivery module 320 configured to receive device statistics from the client devices 100A-100D and determine which client device should receive a particular alert. The alert delivery module 320 may comprise hardware, software, or a combination of hardware and software.

The client device 100A of FIG. 1 includes application(s) 120, communications client 140, output device 160 (e.g., a display), and input device 180 (e.g., keyboard, mouse, touch screen). Application(s) 120 provide the client device 100A with a variety of functionalities. Examples include social media functionality, web browsing capabilities, calendars, contact information, games, and document processing. Generally, application(s) 120 employ the output device 160 to display information at a graphical user interface (GUI) 165.

The communications client 140 further includes a communications module 145 that enables output device 160 to display information at the GUI 165. The communications module 145 also enables the communications client 140 to connect to the server device 300. Typically, the communications module 145 is a network module that connects the client device 100A to a network, such as the Internet or a cellular phone network, using one of a variety of available network protocol techniques.

The GUI 165 is configured to display alerts 170 received from the server device 300 over the communications channel 200A. The alert informs the user that a new message or update has been received. The message or update can be consumed via one or more application(s) 120.

In some embodiments, client devices 100B-100D include similar elements and functions as client device 100A. In other embodiments, client devices 100B-100D include different, fewer, or more elements and functions as client device 100A.

Referring now to FIG. 2, one particular example of client device 100A is illustrated. Many other embodiments of the client device 100A may be used as long as they support receiving alerts. In the illustrated embodiment of FIG. 2, the client device 100A includes one or more processors 101, memory 102, a network interface 103, one or more storage devices 104, a power source 105, output device 160, and input device 180. The client device 100 also includes an operating system 108 and a communications client 140 that are executable by the client. In a conventional fashion, each of components 101, 102, 103, 104, 105, 160, 180, 108, and 140 are interconnected physically, communicatively, and/or operatively for inter-component communications.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100 during operation. In some embodiments, memory 102 includes a temporary memory, area for information not to be maintained when the client device 100 is turned OFF. Examples of such temporary memory include volatile memories such as random access memories (RAM), dynamic random access memories (DRAM), and static random access memories (SRAM). Memory 102 maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100A uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, LTE (Long Term Evolution) network interface, and USB (Universal Serial Bus). In some embodiments, the client device 100A uses network interface 103 to wirelessly communicate with an external device such as the server device 300 of FIG. 1, a mobile phone, or other networked computing device.

The client device 100A includes one or more input devices 180. Input device 180 is configured to receive input from a user through tactile, audio, and/or video feedback. Non-limiting examples of input device 180 include a presence-sensitive screen, a mouse, a keyboard, a voice responsive system, a video camera, a microphone, or any other type of device for detecting a command from a user. In some examples, a presence-sensitive screen includes a touch-sensitive screen.

One or more output devices 160 are also included in client device 100A. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client device 100A includes one or more power sources 105 to provide power to the client device. Non-limiting examples of power source 105 include single-use power sources, rechargeable power sources, and/or power sources developed from nickel-cadmium, lithium-ion, or other suitable material.

The client device 100A includes an operating system 108, such as the Android® operating system. The operating system 108 controls operations of the components of the client device 100A. For example, the operating system 108 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client device 100A. For example, in one embodiment, communications module 145 includes instructions causing the communications client 140 executing on the client device 100A to perform one or more of the operations and actions described in the present disclosure.

In some embodiments, communications client 140 and/or communications module 145 form a part of operating system 108 executing on the client device 100. In other embodiments, communications client 140 receives input from one or more of the input devices 180 of the client device 100A. Communications client 140 is configured to receive alerts associated with messages from a server device 300.

Figure 3:
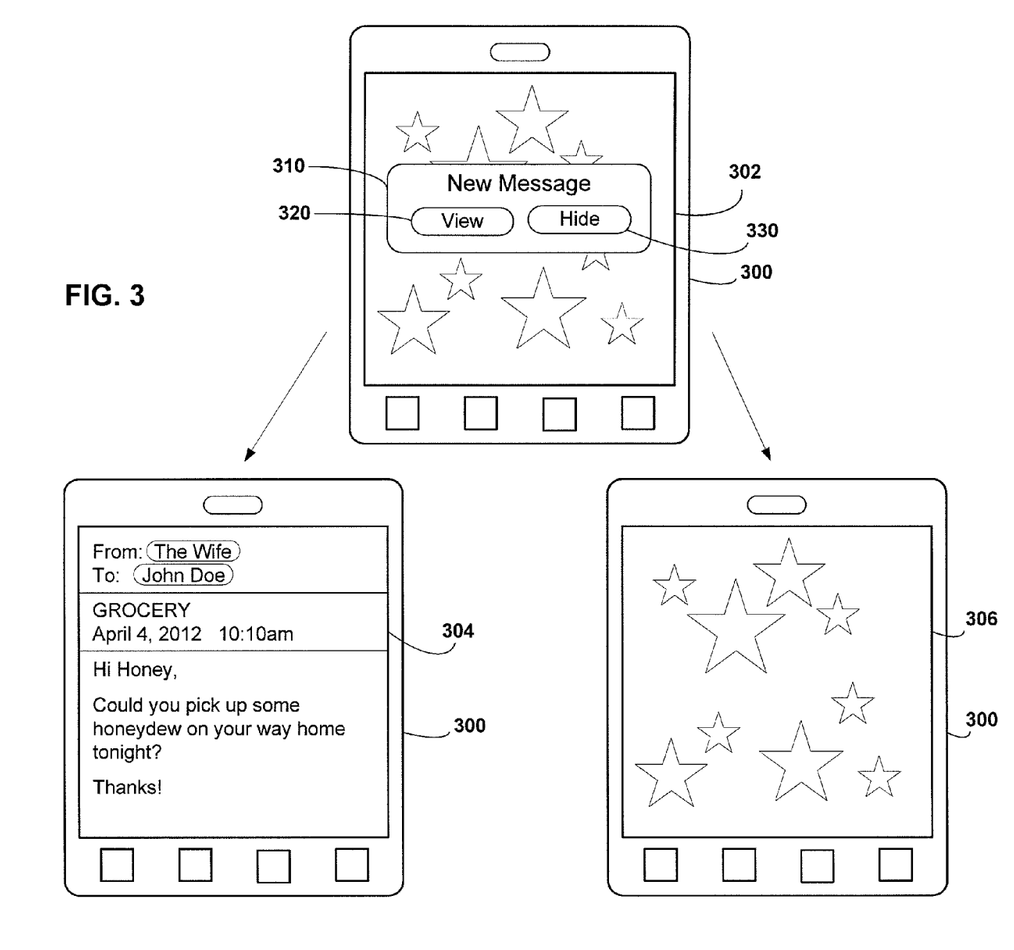
FIG. 3 is a conceptual diagram illustrating an example alert, according to one embodiment.

FIG. 3 is a conceptual diagram illustrating an example alert, according to one embodiment. As shown, alert 310 is displayed in a GUI 302 of mobile device 300. The alert 310 is associated with a new message and includes options to view 320 the message or hide 330 the alert 310 and view the message later. If a user selects to the view 320 the message, the message can be viewed in an application that corresponds to the type of message received. An example GUI 304 showing an email application where the user can view the message is shown in FIG. 3.

If the selects to hide 330 the alert 310, the alert 310 is removed from the GUI. An example GUI 306 of a hidden or dismissed alert is also shown in FIG. 3. After the alert 310 is hidden, the GUI 306 displays whatever was shown on the device 300 prior to receiving the alert 310.

As described above, embodiments provide a technique for delivering alerts, where the alert is only delivered to a single client device. The alert delivery module 320 included in the server device 300 determines which client device should receive the alert. The alert delivery module 320 may consider various factors when determining which client device should receive the alert. Certain examples are provided in FIG. 4.

Figure 4:
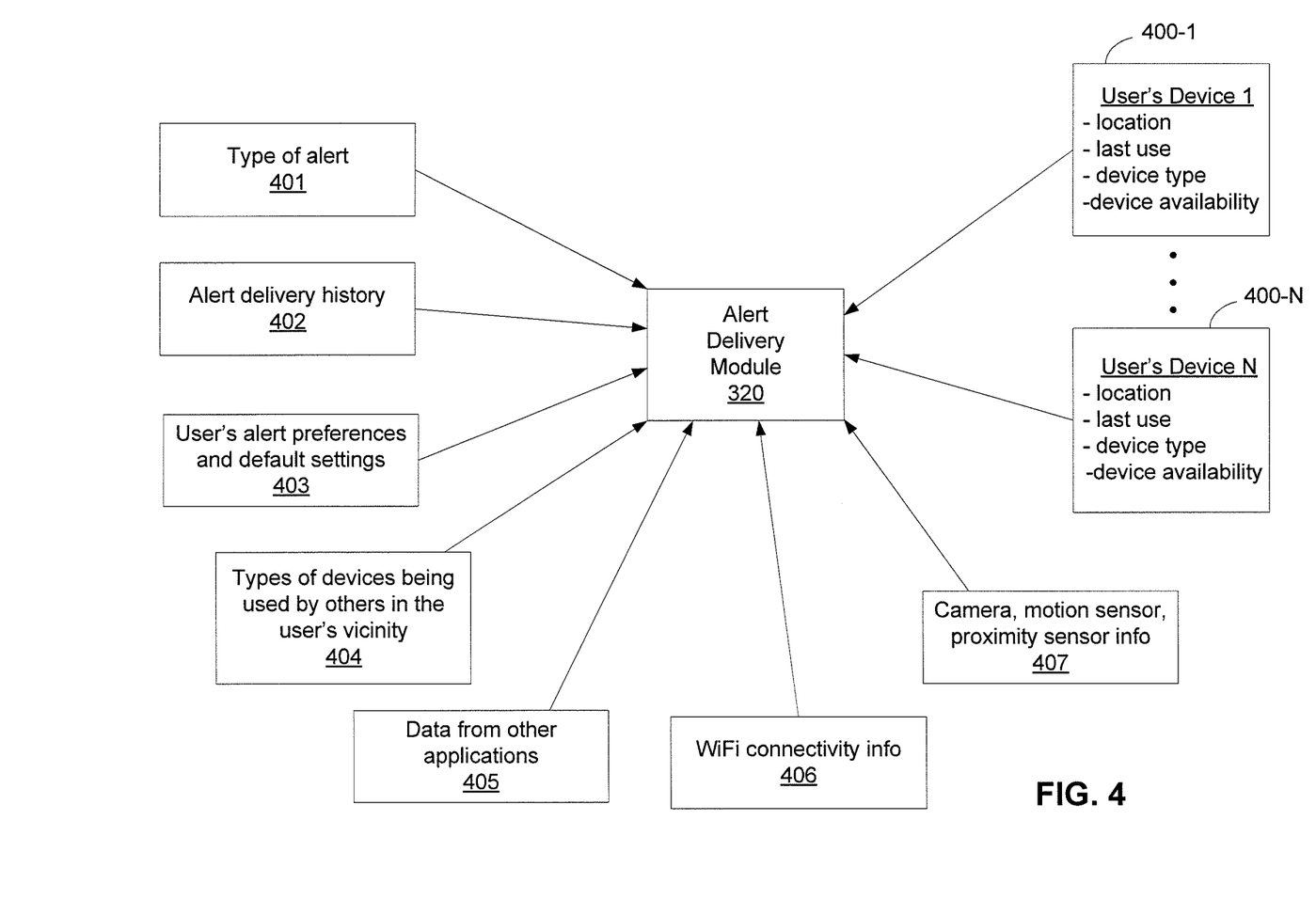
FIG. 4 is a conceptual diagram illustrating an alert delivery module and factors that can be considered when determining which client device should receive an alert, according to one embodiment.

FIG. 4 is a conceptual diagram illustrating an alert delivery module 320 and factors that can be considered when determining which client device should receive an alert, according to one embodiment. In one embodiment, the factors that the alert delivery module 320 uses to determine which device should receive the alert include statistics about the user's one or more devices 400-1 to 400-N. A background process or service executing on the device 400-1 to 400-N may be configured to communicate the device statistics to the alert delivery module 320. For each device, these statistics may include a location for the device, a timestamp of the last use of the device, a device type (e.g., phone, tablet, PC, TV, etc.), and/or device availability, among others. In one embodiment, device availability corresponds to whether the device is currently in a state where the user can consume the message. For example, if the device is a laptop that is powered ON, but the laptop screen of the laptop is currently closed (i.e., the screen and keyboard are not visible), then the laptop is said to be in an "unavailable" state.

In one embodiment, the alert delivery module 320 may receive a message from a device that the device is unavailable after the alert delivery module 320 has transmitted an alert to the device. For example, the alert delivery module may identify a certain device to which to send a particular alert and then sends the alert. However, at the time that the alert is received by the device, the device may be in an "unavailable" or locked state. In one embodiment, the device may send a message to the alert delivery module 320 that the device is unavailable and request the alert delivery module 320 to send the alert to a different device.

In some embodiments, the factors that the alert delivery module 320 uses to determine which device should receive the alert further include information about the type of alert to be delivered 401 (e.g., email, SMS, picture, etc.). Certain types of devices may be better suited to display certain types of messages.

In some embodiments, the factors that the alert delivery module 320 uses to determine which device should receive the alert further include information about alert delivery history 402. For example, when the alert delivery module 320 is determining which device should receive the alert, the alert delivery module 320 may consider that the last time that an alert of a certain type was delivered to the user under similar circumstances, the alert was not immediately consumed by the user. The alert delivery module 320 may then give preference to delivering the alert to a different client device. In addition, in some embodiment, the alert delivery module 320 may also consider a user's alert preferences or default settings 403. For example, the user may set a profile parameter that indicates that all email alerts should be delivered to the user's mobile phone; whereas, all video message alerts should be delivered to the user's tablet computer.

In some embodiments, the alert delivery module 320 may consider what types of devices are being used by other users in the vicinity of the user 404. For example, the alert delivery module 320 may determine that the user is away from home and is "on-the-go." The alert delivery module 320 may come to this determination from location information received from the user's mobile phone. The alert delivery module 320 may also determine that many other users (e.g., 100 or more users) are within the general vicinity (e.g., within 1 km$^2$) of the user's location, also from the location information received from the other users' mobile phones. The alert delivery module 320 may determine that many of the other users within the general vicinity of the user are consuming alerts primarily with their mobile phone. In such a scenario, the alert delivery module 320 may determine that the present alert directed to the user should be delivered to the user's mobile phone. An example of this use case is when a user is attending a concert or sporting event with many other users in close proximity. The user may be carrying a mobile phone in their pocket and a tablet computer is their backpack or purse. Although the alert could be delivered to either the mobile phone or to the tablet computer, many of the other users in the vicinity are consuming messages via their mobile phones, since it may be awkward or dangerous to be using a tablet computer in such an environment. Therefore, the alert delivery module 320 may determine that the alert should be delivered to the user's mobile phone, and not to the tablet computer.

In some embodiments, the alert delivery module 320 may consider data received from other applications that user has recently used 405. For example, the alert delivery module 320 may be able to receive usage statistics and/or usage information from an email application or a search provider. The usage statistics and/or usage information may include the type of device that the user is using to perform various actions. As an example, if a user is presently using a desktop computer to perform a search using a search provider website, then the alert delivery module 320 may determine to send the alert to the desktop computer since the user is actively using that device.

In some embodiments, the alert delivery module 320 may consider wireless network connectivity of the user's devices 406. For example, there may be a preference for sending alerts to devices that are connected to a wireless Internet network, as opposed to a cellular network.

In some embodiments, the alert delivery module 320 may consider data received from cameras, motion sensors, proximity sensors, or the like 407 when determining which device should receive an alert. For example, if a proximity sensor on an Internet-enabled appliance (e.g., Internet-enabled refrigerator) determines that the user is within 1 meter of the Internet-enabled appliance at the time the alert is to be delivered, then the alert delivery module 320 may give preference to delivering the alert to the Internet-enabled appliance.

Various other factors may be considered by the alert delivery module 320 and are also within the scope of embodiments of the disclosure.

In some embodiments, multiple factors can be combined by the alert delivery module 320 to generate a "score" for each of the user's devices. The device having the highest calculated score may be the device that the alert delivery module 320 determines should receive the alert. In one embodiment, each factor is given an equal weight when calculating a score for a particular device. In other embodiments, different factors are given different or the same weights when calculating a score for a particular device.

Figure 5:
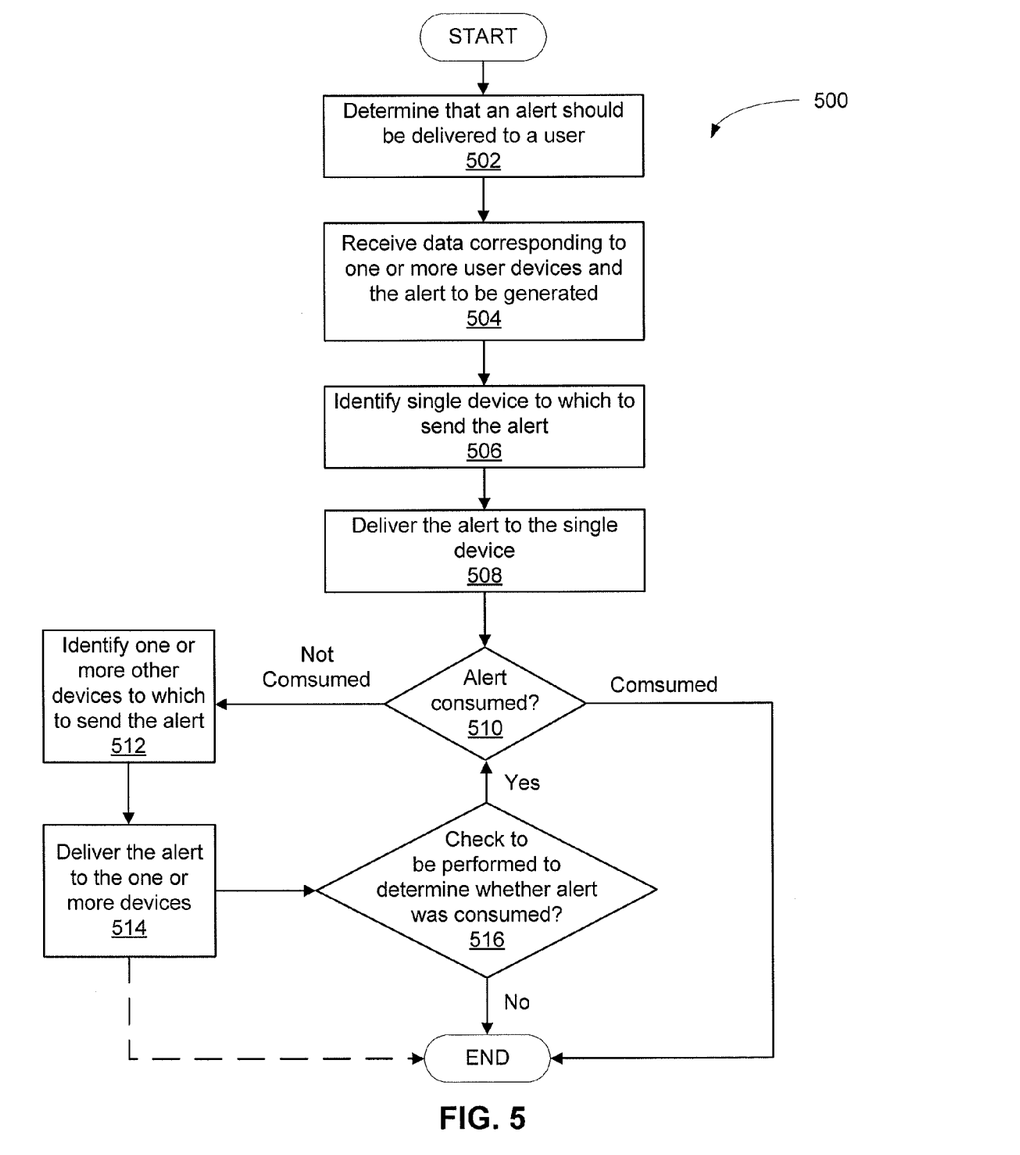
FIG. 5 is a flowchart illustrating delivering an alert to a client device, according to one embodiment.

FIG. 5 is a flowchart illustrating delivering an alert to a client device, according to one embodiment. Persons skilled in the art will understand that even though the method 500 is described in conjunction with the systems of FIGS. 1-4, any system configured to perform the method stages is within the scope of embodiments of the disclosure.

As shown, at stage 502, the alert delivery module 320 determines that an alert should be delivered to a user. The alert delivery module 320 resides on and is executed by a server device. In some embodiments, a separate alert delivery module 320 may be provided for each different type of alert to be delivered by the server device. In other embodiments, a single alert delivery module 320 is configured to deliver alerts of multiple types.

At stage 504, the alert delivery module 320 receives data corresponding to one or more user devices and data corresponding to the alert to be generated. Examples of the data received by the alert delivery module 320 are illustrated in FIG. 4.

At stage 506, the alert delivery module 320 identifies a single device to which to send the alert. As described above, identifying the single device that should receive the alert may be based on calculating a score for each of the user's devices. The identified device may be, in some cases, the device with the highest calculated score.

At stage 508, the alert delivery module 320 causes the alert to be alert to be delivered to the identified single device. At stage 510, the alert delivery module 320 determines whether the user has consumed the alert. In one embodiment, determining whether the user has consumed the alert included determining whether the user has selected to view the message associated with the alert within a threshold amount of time. If the alert delivery module 320 determines that the user has consumed the alert, then the method 500 terminates.

If, at stage 510, the alert delivery module 320 determines that the user has not consumed the alert, then the method 500 proceeds to stage 512, where the alert delivery module 320 identifies one or more other devices to which to send the alert. At stage 514, the alert delivery module 320 delivers the alert to the one or more other devices identified at stage 512. In one embodiment, the one or more other devices identified at stage 512 includes only the device with the second highest calculated score (besides the single device identified at stage 506 that had the highest score). In other embodiments, the one or more other devices identified at stage 512 includes all of the user's devices other than the single device identified at stage 506. In still further embodiments, the one or more other devices identified at stage 512 includes multiple, but less than all, of the user's devices other than the single device identified at stage 506.

In some embodiments, after the alert has been delivered to the one or more other devices (i.e., stage 514), the method 500 proceeds to stage 516 where the alert delivery module 320 determines whether a check should be performed to determine whether the alert was consumed. In other embodiments, from stage 514, the alert delivery module 320 does not determine whether a check should be performed to determine whether the alert was consumed and the method 500 terminates, as indicated by the dotted arrow from stage 514. In other words, after the alert is delivered to the one or more other devices at stage 514, in some embodiments the alert delivery module may check for consumption of the alert (i.e., stage 516), and in other embodiments, no check for consumption is performed or considered by the alert delivery module 320.

At stage 516, the alert delivery module 320 determines whether a check should be performed to determine whether the alert was consumed. If not, then the method 500 terminates. For example, assume that at stage 514, the alert was delivered to all of the user's devices. In such a scenario, the alert delivery module 320 may not wish to perform a check for consumption since there are no additional devices to which the alert could be sent. However, if the alert delivery module 320, at stage 516, determines that a check should be performed to determine whether the alert was consumed, the method 500 returns to stage 510 where the alert delivery module 320 determines whether the alert has been consumed. In this scenario, the method 500 may repeat stages 510, 512, 514, 516 until the alert has been consumed. In some embodiments, at stage 512, identifying the one or more other devices to which to send the alert is based on data previously received at stage 504 or a previous execution of stage 512, newly received data from the one or more user devices that is received after determining that the alert has not been consumed, or a combination of previously received data and newly received data.

It will be appreciated that the stages depicted in FIG. 5 need not necessarily be performed in the order shown and certain stages may be performed in a different order or simultaneously. It will further be appreciated that certain stages need not constitute separate "steps" and that some of the stages may be ongoing once initiated. Moreover, it will be appreciated that FIG. 5 merely depicts an example embodiment of the present disclosure, and that the components and processing stages depicted therein may be modified, added, or removed in other embodiments.

In one embodiment, once the user has consumed the alert on a device, the data associated with the message is delivered to the device. In other embodiments, the data has already been received by the device, and once the user consumes the alert, the data is displayed or made accessible. Examples of two embodiments for delivering the data to the device are shown in FIGS. 6A-6B.

Figure 6A:
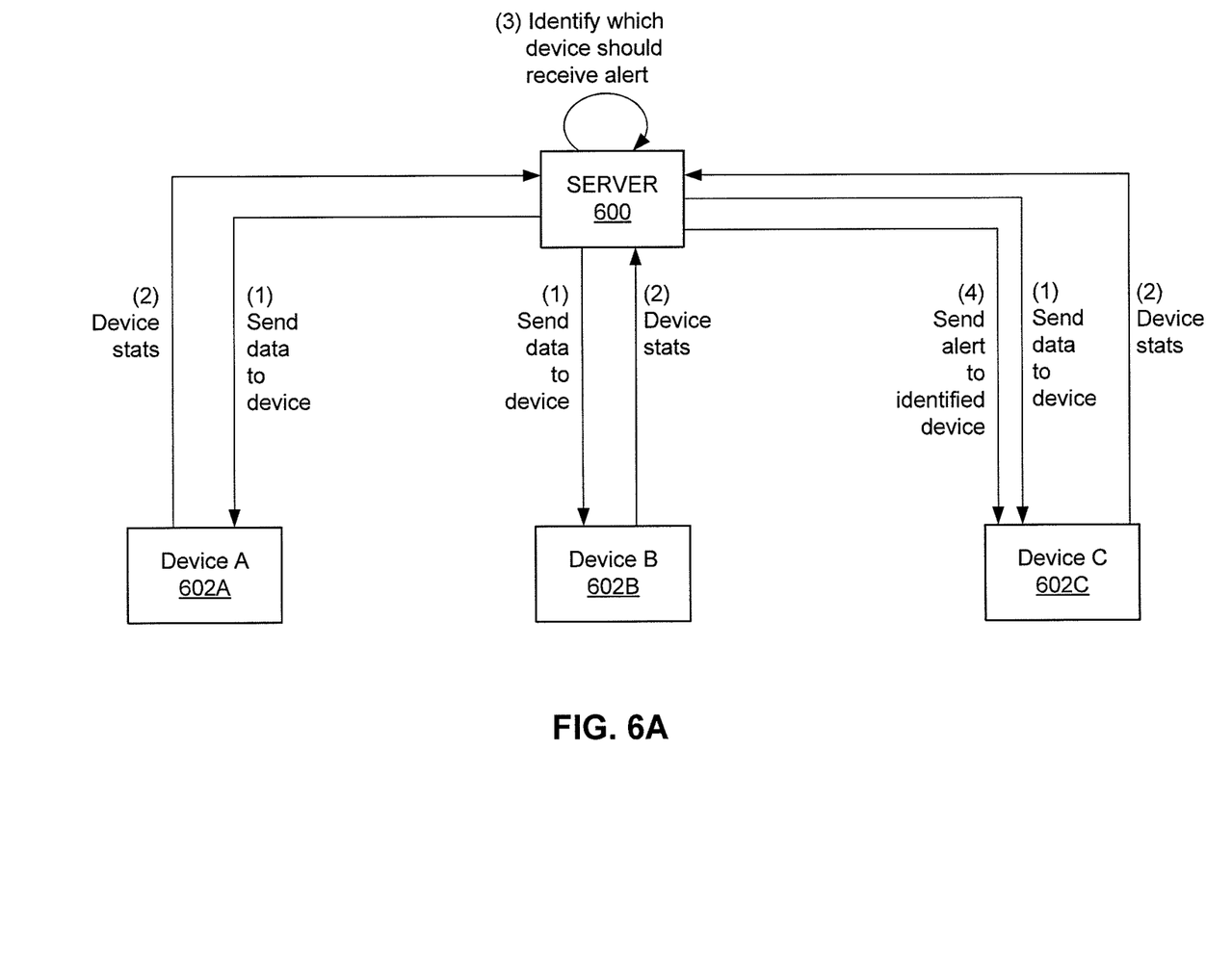
FIGS. 6A-6B are conceptual diagrams illustrating delivering an alert and corresponding data to one or more client devices, according to various embodiments.
Figure 6B:
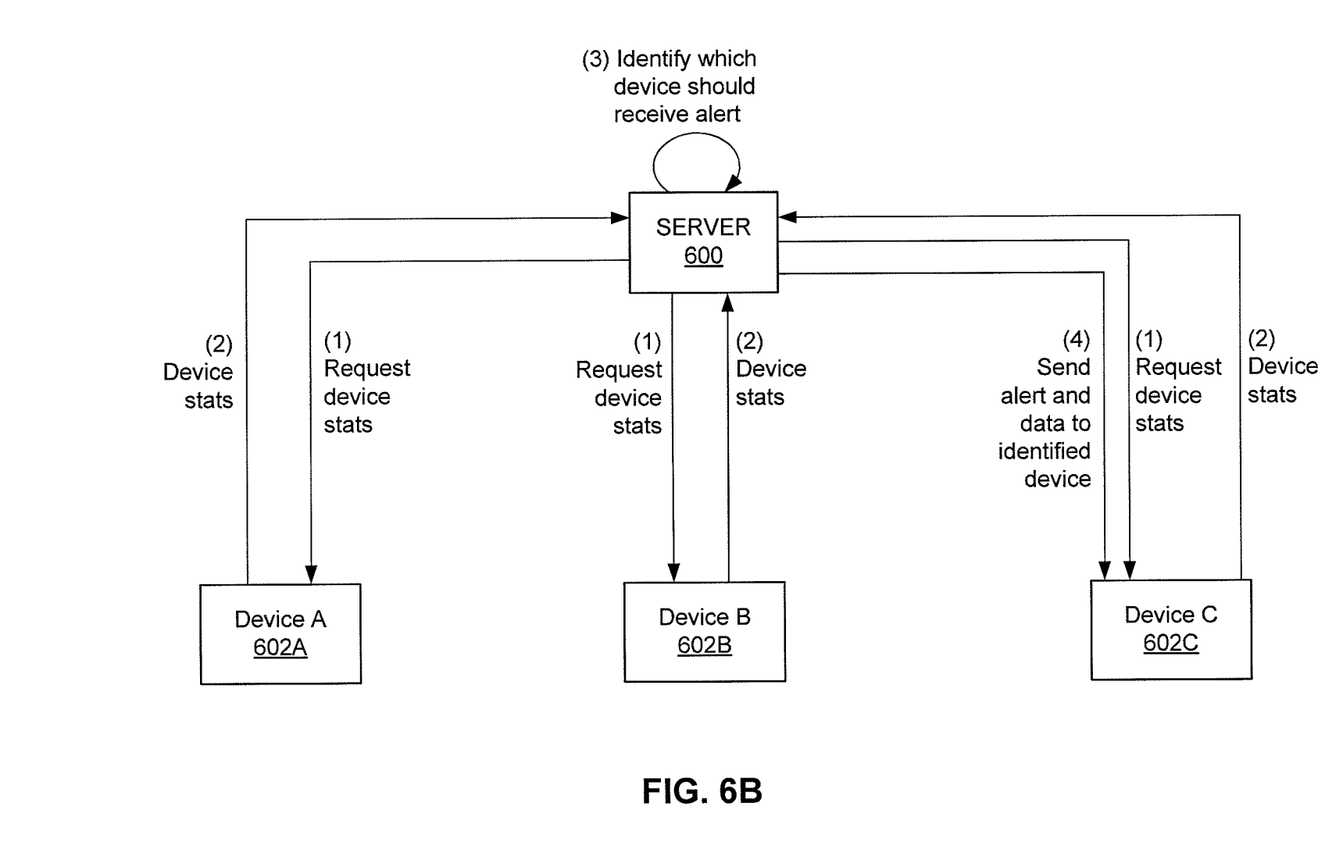

FIGS. 6A-6B are conceptual diagrams illustrating delivering an alert and corresponding data to one or more client devices, according to various embodiments. As described, a message may corresponds to an alert and separate data. An example includes an email message, where the alert simply notifies the user than an email has been received and the data associated with the email message includes the content of the email message.

As shown in FIG. 6A, a server 600 is in communication with three devices 602A, 602B, 602C that are associated with a particular user. When the server 600 determines that a message is to be transmitted to the user, the data associated with the message is delivered to each of the devices 602A-602C (shown as step "1" in FIG. 6A). In some embodiments, although the data associated with message is already received by a particular device, the user may not be aware that the data has been received and may not be able to access the data.

In response to receiving the data associated with the message, each device responds to the server 600 with statistics about the particular device (shown as step "2" in FIG. 6A). After the server 600 receives the device statistics from the devices 602A-602C, the server 600 indentifies which device should receive an alert associated with the message (shown as step "3" in FIG. 6A). As described above in FIG. 4, various factors, including the device statistics received from the devices 602A-602C, may be used by the server 600 determine which device should receive the alert. The server 600 then delivers the alert to the identified device (shown as step "4" in FIG. 6A). In the example shown in FIG. 6A, the identified device is device 602C. The user can then consume the alert via the device and, in turn, consume the message and the associated data. Again, the data corresponding to the message has already been delivered previously to each of the devices in the embodiment shown in FIG. 6A.

FIG. 6B is a conceptual diagrams illustrating another embodiment of delivering an alert and corresponding data to one or more client devices. As shown in FIG. 6B, a server 600 is in communication with three devices 602A, 602B, 602C that are associated with a particular user. When the server 600 determines that a message is to be transmitted to the user, the server 600 requests device statistics from each of the devices 602A-602C (shown as step "1" in FIG. 6B.

In response to receiving the request for device statistics, each device responds to the server 600 with statistics about the particular device (shown as step "2" in FIG. 6B). After the server 600 receives the device statistics from the devices 602A-602C, the server 600 indentifies which device should receive an alert associated with the message (shown as step "3" in FIG. 6B). As described above in FIG. 4, various factors, including the device statistics received from the devices 602A-602C, may be used by the server 600 determine which device should receive the alert. The server 600 then delivers the alert and the corresponding data to the identified device (shown as step "4" in FIG. 6A). In the example shown in FIG. 6B, the identified device is device 602C.

The user can then consume the alert via the device and, in turn, consume the message and the associated data. In the embodiment shown in FIG. 6B, the data corresponding to the message is not delivered to the device until the time the alert is delivered. In some cases, the implementation shown in FIG. 6B may reduce the amount of bandwidth consumed by the server when delivering data and alerts to devices.

In sum, embodiments of the disclosure provide a technique for delivering an alert to a subset of the user's device. In some embodiments, the subset includes just one device. Advantageously, the user is not bombarded with alerts at each of the user's multiple devices. In this manner, a better user experience is provided by implementing embodiments of the disclosure, when compared to conventional approaches.

In the example embodiments, the various applications can be configured on any distributed or embedded platform within a single physical location or multiple locations. For example, the alert delivery module 320 may be resident on an individual and separate platform or may be embedded into the server device 300. As such, embodiments contemplate that applications, resources, managers, servers, etc. may be joined or separated without diverging from their identities and functions. For example, a "server device" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method for delivering an alert, comprising:
determining that an alert should be delivered, wherein the alert corresponds to a message that includes message data;
before sending the alert, sending the message data corresponding to the alert to each of two or more devices capable of receiving the message;
receiving device data corresponding to the two or more devices, wherein the device data is transmitted by each of the two or more devices in response to the device receiving the message data corresponding to the alert;
calculating a score for each of the two or more devices based on the device data received from the two or more devices and corresponding to the two or more devices; and
sending the alert to the device having the highest calculated score, wherein the message data corresponding to the alert has previously been delivered to the device that receives the alert before the alert is sent to the device.

2. The method according to claim 1, wherein the message comprises an email message, an SMS (short message service) message, a picture message, a video message, a social networking update, or an application-related update.

3. A method for delivering an alert, comprising:
determining that an alert should be delivered, wherein the alert corresponds to a message that includes message data;
before sending the alert, sending the message data corresponding to the alert to each of two or more devices capable of receiving the message;
receiving, at a server computing device, device data corresponding to one or more devices, wherein the device data is transmitted by each of the one or more devices to the server computing device in response to the device receiving the message data corresponding to the alert;
identifying a single device of the one or more devices to which to send the alert based on the device data received from the one or more devices and corresponding to the one or more devices; and
sending a first alert to the single device, wherein the message data corresponding to the alert has previously been delivered to the single device that receives the alert before the alert is sent to the single device.

4. The method according to claim 3, wherein identifying the single device is further based on a message type of the message.

5. The method according to claim 3, further comprising:
determining that the first alert was not consumed within a threshold amount of time; and
sending an alert to at least one other device of the one or more devices.

6. The method according to claim 3, wherein the device data corresponding to the one or more devices comprises at least one of a location of at least one device, a time of last use of at least one device, and a device type of at least one device.

7. The method according to claim 3, wherein identifying the single device comprises calculating a score for each of the one or more devices associated with the user, wherein the single device is the device with the highest score.

8. The method according to claim 3, wherein identifying the single device is further based on a usage history of at least one device of the one or more devices.

9. The method according to claim 3, wherein identifying the single device is further based on data received from a proximity sensor included in at least one device of the one or more devices.

10. The method according to claim 3, wherein identifying the single device is further based on data received from other devices that are in a location similar to a location of the single device.

11. A non-transitory computer-readable storage medium storing instructions that, when executed by a processor, cause a computer system to deliver an alert, by performing the steps of:
determining that an alert should be delivered, wherein the alert corresponds to a message that includes message data;
before sending the alert, sending the message data corresponding to the alert to each of one or more devices capable of receiving the message;
receiving device data corresponding to the one or more devices, wherein the device data is transmitted by each of the one or more devices in response to the device receiving the message data corresponding to the alert;
calculating a score for each of the one or more devices based on the device data received from the one or more devices and corresponding to the one or more devices; and
sending the alert to the device having the highest calculated score, wherein the message data corresponding to the alert has previously been delivered to the device that receives the alert before the alert is sent to the device having the highest calculated score.

12. In a system comprising one or more client devices and a server communicatively coupled to the one or more client devices, a method comprising:
- determining that an alert should be delivered, wherein the alert corresponds to a message that includes message data;
- before sending the alert, sending the message data corresponding to the alert to each of the one or more client devices;
- receiving device data corresponding to the one or more client devices, wherein each client device is configured to transmit the device data in response to receiving the message data corresponding to the alert from the server;
- identifying a single client device of the one or more client devices to which to send the alert based on the device data corresponding to the one or more client devices; and
- sending the alert to the single device, wherein the message data corresponding to the alert has previously been delivered to the single device that receives the alert before the alert is sent to the single device.

13. The method according to claim 12, wherein identifying the single client device comprises calculating a score for each of the one or more client devices, wherein the single client device is the device with the highest score.

14. A method for delivering an alert, the method comprising:
- before receiving an alert, receiving, at a client device, message data associated with a message corresponding to the alert;
- storing the message data is a memory associated with the client device;
- in response to receiving the message data associated with the message, at the client device, transmitting device data to a server, wherein the device data includes one or more factors corresponding to the client device; and
- receiving the alert at the client device based on the device data, wherein the server determines that a score associated with the client device is the highest of scores associated with two or more devices configured to transmit device data to the server, wherein the message data corresponding to the alert is already stored in the memory associated with the device before the alert is received at the client device.

15. The method according to claim 14, wherein calculating a score for the client device is based on a weighted aggregation of a plurality of factors included in the device data.

* * * * *